United States Patent
Absil et al.

(10) Patent No.: US 9,791,621 B2
(45) Date of Patent: Oct. 17, 2017

(54) INTEGRATED SEMICONDUCTOR OPTICAL COUPLER

(71) Applicant: IMEC VZW, Leuven (BE)

(72) Inventors: Philippe Absil, Loupoigne (BE); Shankar Kumar Selvaraja, Ghent (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 14/971,466

(22) Filed: Dec. 16, 2015

(65) Prior Publication Data

US 2016/0170139 A1    Jun. 16, 2016

(30) Foreign Application Priority Data

Dec. 16, 2014 (EP) .................................... 14198312

(51) Int. Cl.
*G02B 6/12* (2006.01)
*G02B 6/132* (2006.01)
(Continued)

(52) U.S. Cl.
CPC ................. *G02B 6/12* (2013.01); *G02B 6/13* (2013.01); *G02B 6/132* (2013.01); *G02B 6/136* (2013.01);
(Continued)

(58) Field of Classification Search
CPC ............ G02B 6/12; G02B 6/13; G02B 6/132; G02B 6/136; G02B 2006/12038; G02B 2006/12061; G02B 2006/12169
See application file for complete search history.

(56) References Cited

U.S. PATENT DOCUMENTS

| 8,699,836 B2 * | 4/2014 | Doerr | G02B 6/12004 385/129 |
|---|---|---|---|
| 2004/0190826 A1 * | 9/2004 | Ghiron | G02B 6/4206 385/36 |

(Continued)

FOREIGN PATENT DOCUMENTS

| BE | EP 2648025 A1 * | 10/2013 | ............. G02B 6/124 |
|---|---|---|---|
| BE | EP 2685297 A1 * | 1/2014 | ............... G02B 6/13 |

(Continued)

OTHER PUBLICATIONS

Bauters et al. "Silicon on ultra-low-loss waveguide photonic integration platform," Opt. Express 21, 544-555 (2013).*
(Continued)

*Primary Examiner* — Peter Radkowski
(74) *Attorney, Agent, or Firm* — McDonnell Boehnen Hulbert & Berghoff LLP

(57) ABSTRACT

A method for fabricating an integrated semiconductor photonics device is disclosed. The method may include providing a first substrate having on its top surface a monocrystalline semiconductor layer suitable for supporting an optical mode and forming a homogenous and conformal first dielectric layer on a planar surface of the monocrystalline semiconductor layer. The method may further include providing a dielectric waveguide core on the first dielectric layer, the dielectric waveguide core optically coupled to a first region of the monocrystalline semiconductor layer through the first dielectric layer. The method may further include depositing a second dielectric layer on the dielectric waveguide core, thereby covering the dielectric waveguide core, and annealing the substrate to drive hydrogen out of the dielectric waveguide core.

9 Claims, 7 Drawing Sheets

(51) Int. Cl.
*G02B 6/13* (2006.01)
*G02B 6/136* (2006.01)

(52) U.S. Cl.
CPC .............. *G02B 2006/12038* (2013.01); *G02B 2006/12061* (2013.01); *G02B 2006/12169* (2013.01)

(56) References Cited

U.S. PATENT DOCUMENTS

| | | | | |
|---|---|---|---|---|
| 2004/0207016 | A1* | 10/2004 | Patel | G02B 6/12004 257/347 |
| 2004/0213518 | A1* | 10/2004 | Ghiron | G02B 6/12 385/36 |
| 2005/0152660 | A1* | 7/2005 | Heideman | G02B 6/122 385/131 |
| 2006/0098927 | A1* | 5/2006 | Schmidt | G01N 21/0303 385/129 |
| 2010/0158437 | A1* | 6/2010 | Decorby | B82Y 20/00 385/14 |
| 2011/0008001 | A1* | 1/2011 | Doerr | G02B 6/12004 385/37 |
| 2011/0255824 | A1* | 10/2011 | Lee | G02B 6/1228 385/14 |
| 2012/0204956 | A1* | 8/2012 | Apostolos | H01L 31/02325 136/259 |
| 2013/0259077 | A1* | 10/2013 | Ben Bakir | G02B 6/12004 372/44.01 |
| 2013/0322813 | A1* | 12/2013 | Grondin | B82Y 20/00 385/14 |
| 2014/0294341 | A1* | 10/2014 | Hatori | G02B 6/12 385/14 |
| 2015/0140720 | A1* | 5/2015 | Collins | G02B 6/13 438/65 |

FOREIGN PATENT DOCUMENTS

| | | | | |
|---|---|---|---|---|
| BE | WO 2014009029 | A1 * | 1/2014 | .............. G02B 6/13 |
| CN | 104335088 | A * | 2/2015 | .............. G02B 6/13 |
| EP | 2685297 | A1 | 1/2014 | |
| WO | 2014/047443 | A1 | 3/2014 | |
| WO | WO 2014047443 | A1 * | 3/2014 | ........... H01L 31/105 |

OTHER PUBLICATIONS

European Search Report, European Patent Application No. 14198312.2, dated Jun. 11, 2015.
Agnihotri O.P. et al., "Advances in Low Temperature Processing of Silicon Nitride Based Dielectrics and Their Applications in Surface Passivation and Integrated Optical Devices", Semicond. Sci. Technol., vol. 15, 2000, pp. R29-R40.
McNab, Sharee J. et al., "Ultra-Low Photonic Integrated Circuit With Membrane-Type Photonic Crystal Waveguides", Optics Express, vol. 11, No. 22, Nov. 3, 2003, pp. 2927-2939.
Shi, Xueliang et al., "CMOS-Compatible Long-Range Dielectric-Loaded Plasmonic Waveguides", Journal of Lightwave Technology, vol. 31, No. 21, Nov. 1, 2013, pp. 3361-3367.
Stutius W. et al., "Silicon Nitride Films on Silicon for Optical Waveguides", Applied Optics, vol. 16, No. 12, Dec. 1977, pp. 3218-3222.

* cited by examiner

INTEGRATED SEMICONDUCTOR OPTICAL COUPLER

CROSS-REFERENCE TO RELATED APPLICATION

The present application is a non-provisional patent application claiming priority to European Patent Application No. 14198312.2 filed Dec. 16, 2014, the contents of which are hereby incorporated by reference.

TECHNICAL FIELD

The present disclosure relates to integrated semiconductor based photonics devices and a method for fabrication thereof, and more specifically to integrated dielectric waveguides and a monocrystalline semiconductor layer suitable for optical mode, coupled to the integrated dielectric waveguide.

BACKGROUND

Integrated silicon based photonics currently include dielectric waveguides in combination with optically coupled silicon waveguides in a single device. The dielectric waveguide has a waveguide core made of amorphous dielectric material. The silicon waveguide carries light in a waveguide core made of single crystal silicon.

The dielectric waveguide, when coupled to an optical fiber, has a low loss, exhibits lower propagation loss, and has a wide spectral bandwidth. Silicon waveguides can be used in the realization of active optical devices such as modulators, detectors, and others.

International patent application WO2014/047443 discloses wafer scale integration of ultra-low-loss dielectric waveguides with silicon and/or compound semiconductor waveguides on a common substrate. The method disclosed is based on the fact that the silicon and/or compound semiconductor waveguides and other active optical devices are formed after the dielectric waveguide has been formed and annealed at a high temperature (typically above 900° C.). To enable this, a bonding step is introduced that defines the cladding layer of the dielectric waveguide. Although the method allows the combination of two disparate waveguide technologies by a bonding step, it introduces a bonding interface in the cladding layer between the dielectric waveguide core and the first region of the semiconductor layer that is optically coupled to the dielectric waveguide core.

This bonding has a detrimental effect on the optical coupling between the dielectric waveguide core and the first region of the semiconductor layer through the inter-waveguide cladding layer. This detrimental effect is caused by a limited control of the thickness of the inter-waveguide cladding layer between the dielectric waveguide core and the first region of the semiconductor layer. First, the cladding deposition, usually performed by chemical vapor deposition (CVD), has a finite controllability. Second, the required polishing step of this nascent cladding layer prior to bonding is not well-controlled. Chemical Mechanical Polishing (CMP) is used to polish the nascent cladding layer. This technique is known in the art to suffer from oxide loss, dishing, and erosion, and these effects will cause local and global thickness variation in the thickness of the inter-waveguide cladding layer after the bonding step. The thickness is nevertheless a critical design parameter for the optical coupling between the dielectric waveguide core and the first region of the semiconductor layer. Especially on wafer scale, these thickness variations will be more pronounced and cause dispersion in optical coupling observed in multiple identical optically integrated devices on a single wafer.

International patent application WO2014/047443 further discloses that the total thickness after bonding of the inter-waveguide cladding is equal to the combined thickness of the nascent cladding layer and thickness of the thermally grown oxide.

International patent application WO2014/047443 further discloses that the thickness of the nascent cladding layer can be controlled with extremely high precision, and that this control of thickness is used to enable high precision of the final total thickness by controlling the thermal oxidation and tailoring the thickness of the nascent cladding layer to the desired total thickness minus a measured value of the thickness of the thermally grown oxide. This method only allows compensation for a measured (average) value of the thickness variation and does not take into account the local thickness variations introduced by the CMP. Because the thermally grown oxide is conformal and will exhibit the same thickness over the whole surface, the local variation will remain present in the final total thickness.

There is a need to improve further the uniformity of the optical coupling through the inter-waveguide cladding.

SUMMARY OF THE DISCLOSURE

Embodiments of the present disclosure provide integrated semiconductor photonic devices and methods that offer good variability and uniformity in the optical coupling between a dielectric waveguide core and a crystalline semiconductor layer of the device, e.g., improved variability and uniformity in the optical outcoupling over the prior art. It is an advantage of embodiments of the present disclosure that improved variability and high uniformity is obtained in the optical coupling through a first dielectric layer between an annealed dielectric waveguide core and a region of a monocrystalline semiconductor layer suitable for supporting an optical mode. The coupling uniformity and improved variability may be obtained on both small (single device) scale and large (wafer) scale.

It is an advantage of embodiments of the present disclosure that an improved variability and high uniform optical coupling is achieved on a small scale, e.g., the scale of a single integrated photonics device. This results in accurately controlled optical coupling between the dielectric waveguide core and the monocrystalline semiconductor of the single integrated photonics device.

It is an advantage of the embodiments of the present disclosure that a low variability and high uniform optical coupling is achieved on a large scale, e.g., between all substantially identical optical devices selected from a single or multiple wafers. This results in an optical design window that can be enlarged, thus enabling higher optical performance and/or higher optical yield in a volume production line.

It is an advantage of the embodiments of the present disclosure that the thickness of the first dielectric layer can be controlled independently and is not dependent on a thickness of an existing layer, as is the case in international patent application WO2014/047443.

It is an advantage of the embodiments of the present disclosure that the first dielectric layer is a homogeneous and conformal first dielectric layer, and has a uniform thickness and composition in any location in the first dielectric layer.

In one aspect, the present disclosure relates to a method for fabricating an integrated semiconductor photonics device. The method may include providing a first substrate having on its top surface a monocrystalline semiconductor layer suitable for supporting an optical mode. The method may further include forming a homogeneous and conformal first dielectric layer on a planar upper main surface of the monocrystalline semiconductor layer. The method may further include providing a dielectric waveguide core on the first dielectric layer, the dielectric waveguide core being optically coupled to a first region of the monocrystalline semiconductor layer through the first dielectric layer. The method may further include depositing a second dielectric layer on the dielectric waveguide core, thereby covering the dielectric waveguide core, and annealing the dielectric waveguide core, thereby driving hydrogen out of the dielectric waveguide core.

It is an advantage of embodiments of the present disclosure that the first dielectric layer is a homogeneous and conformal layer, resulting in improved control of the optical coupling and increased design window.

According to some embodiments of the disclosure, the method may further include annealing the second dielectric layer, thereby driving hydrogen out of the second dielectric layer.

It is an advantage of some embodiments that the second dielectric may be annealed, thereby driving hydrogen out of the second dielectric and improving the propagation loss of an optical mode propagating in the dielectric waveguide.

According to some embodiments of the disclosure, the method may further include providing a second substrate having a third dielectric layer on a main surface of the second substrate. The method may further include attaching the second substrate to the first substrate by attaching the third dielectric layer to the second dielectric layer at an attaching interface. The method may further include, thereafter, exposing the monocrystalline semiconductor layer by removing the first substrate and, after the annealing process, forming an optical component in the exposed monocrystalline semiconductor layer.

It is an advantage of some embodiments of the present disclosure that the monocrystalline semiconductor layer can be used for forming optical devices after the anneal step, while assuring mechanical stability of the integrated photonics device by a second substrate.

According to some embodiments, forming the optical component may include forming a semiconductor waveguide core in a second region of the monocrystalline semiconductor layer, where the second region includes at least part of the first region of the monocrystalline semiconductor layer.

It is an advantage of some embodiments of the present disclosure that a semiconductor waveguide core can be optically coupled to an annealed dielectric waveguide core with improved control over the optical coupling between them.

According to some embodiments, forming the optical component may include doping part of the exposed monocrystalline semiconductor layer.

It is an advantage of some embodiments of the present disclosure that active components can be integrated in the monocrystalline semiconductor layer after the dielectric waveguide core is annealed.

According to some embodiments of the disclosure the second substrate may be a wafer comprising a plurality of integrated semiconductor photonics devices. The method may further include, after the formation of the optical component, singulating the wafer into a number of substantially identical integrated semiconductor photonics devices.

It is an advantage of some embodiments of the present disclosure that a number of substantially identical integrated photonics devices can be obtained that have good variability in the optical coupling between the semiconductor waveguide core and the annealed dielectric waveguide core, e.g., improved variability in the optical coupling compared to the prior art.

According to some embodiments, forming the dielectric waveguide core may include depositing a dielectric waveguide layer on the first dielectric layer and patterning the dielectric waveguide layer to form the dielectric waveguide core.

According to some embodiments, the first and second dielectric layers may have a refractive index lower than the refractive index of the dielectric waveguide core.

According to some embodiments, forming the first dielectric layer may include thermally growing an oxide on the monocrystalline semiconductor layer.

In a further aspect, the disclosure relates to an integrated semiconductor photonics device including a planar monocrystalline semiconductor layer and a homogeneous and conformal first dielectric layer formed on the monocrystalline semiconductor layer. The device may further include a dielectric waveguide core formed on the first dielectric layer adapted to optically couple to a first region of the monocrystalline semiconductor layer through the first dielectric layer and a second dielectric layer adapted to cover the dielectric waveguide core. The hydrogen content of at least the dielectric waveguide core may be selected to form a waveguide with a propagation loss less than 1 dB per centimeter.

It is an advantage of embodiments of the present disclosure that the integrated photonics device has a first dielectric layer with a homogeneous structure and is conformal in thickness. This results in improved variability in the coupling coefficient of the obtained integrated photonics device.

According to some embodiments of the present disclosure, the integrated semiconductor photonics device may further include a first substrate on which the monocrystalline semiconductor layer is located.

According to some embodiments of the present disclosure the integrated semiconductor photonics device may further include a second substrate with a third dielectric layer formed thereon, where the third dielectric layer is attached to the second dielectric layer at an attaching interface.

According to some embodiments of the present disclosure, the integrated semiconductor photonics device may include a semiconductor waveguide core in a second region of the monocrystalline semiconductor layer, where the second region includes at least part of the first region.

It is an advantage of some embodiments of the present disclosure that a monocrystalline semiconductor layer may be optically coupled to a low propagation loss dielectric waveguide core with improved control of the optical coupling.

In a further aspect, the disclosure relates to an integrated semiconductor wafer including a plurality of substantially identical photonics devices fabricated concurrently according to example embodiments.

It is an advantage of some embodiments of the present disclosure that for a number of integrated photonics devices obtained from a single integrated semiconductor wafer, each optical photonics device may have improved control of the optical coupling, resulting in a low variability, e.g., lower when compared to the prior art, of the optical coupling between all devices of the single integrated semiconductor wafer. This may increase the optical design window, yielding better performing devices, or may increase the wafer yield when the design window is not enlarged.

DETAILED DESCRIPTION

Figure 1A:
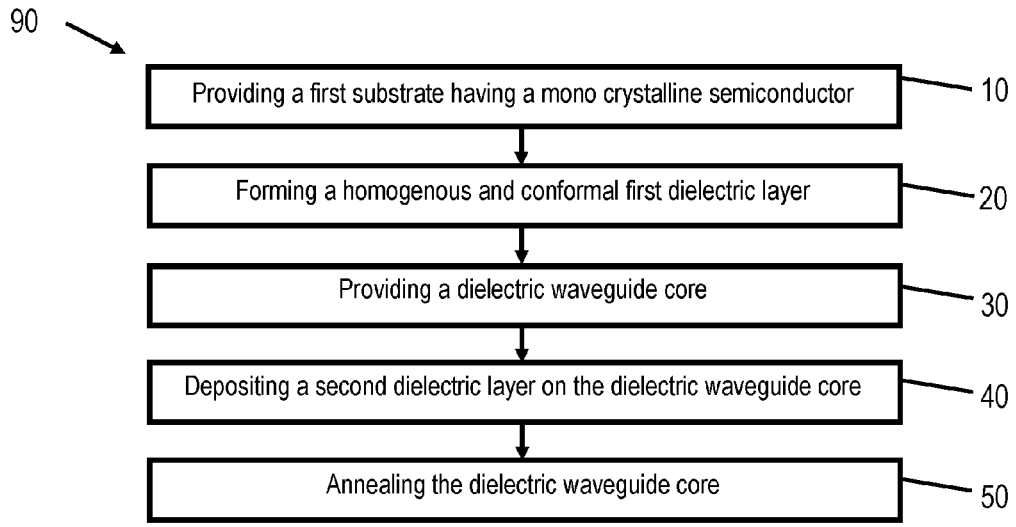
FIGS. 1A-1D illustrate steps of a method for fabricating integrated semiconductor photonics device according to some embodiments of the present disclosure.

The present disclosure will be described with respect to particular embodiments and with reference to certain drawings, but the disclosure is not limited thereto. The drawings described are only illustrative and are non-limiting. In the drawings, the size of some of the elements may be exaggerated and not drawn to scale for illustrative purposes. The dimensions and the relative dimensions do not correspond to actual reductions to practice of the disclosure.

Furthermore, the terms first, second, and the like in the description, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, under, and the like in the description are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising," used in the claims, should not be interpreted as being restricted to the means listed thereafter; it does not exclude other elements or steps. It is thus to be interpreted as specifying the presence of the stated features, integers, steps, or components as referred to, but does not preclude the presence or addition of one or more other features, integers, steps, components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

Similarly, it should be appreciated that in the description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other, features included in other embodiments, combinations of features of different embodiments are meant to be within the scope of the invention and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures, and techniques have not been shown in detail in order not to obscure an understanding of this description.

In one aspect, the present disclosure relates to a method 90 for fabricating an integrated semiconductor photonics device according to embodiments of the current disclosure, as illustrated in FIG. 1A. Cross-sectional views of a portion of the obtained device at different steps of the method are illustrated in FIGS. 2A-D.

The first step 10 of the method 90 is providing a first substrate 110 having a monocrystalline semiconductor layer 130.

Figure 2A:
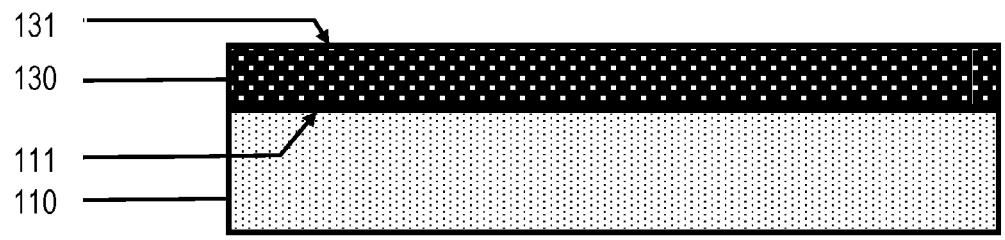
FIGS. 2A-2D illustrate a set of cross-sectional views of a portion of the integrated semiconductor photonics device at different steps of the method according to an embodiment of the present disclosure.

FIG. 2A depicts a schematic representation of a cross-sectional view of a portion of the first substrate 110 having on its top surface a monocrystalline semiconductor layer 130.

The first substrate 110 can be a semiconductor substrate, for instance a silicon substrate, suitable for use with planar semiconductor integration technologies. Other materials suitable for the first substrate 110 may be, but are not limited to: glass, fused silica, germanium, silicon germanium, or other compound semiconductor materials.

In some embodiments, the first substrate 110 is sacrificial and can be removed. The first substrate 110 can include a means to remove the first substrate 110 from the monocrystalline semiconductor layer 130. The means to remove can be, for example, an ion implanted layer suitable for releasing the first substrate 110 as in a smart cut process. The means to remove can be a buried oxide layer (BOX-layer) as part of a semiconductor on insulator (SOI) substrate used as first substrate 110. The means to remove can be an etch stop layer to selectively etch away the first substrate 110. The BOX layer can be used as an etch stop layer for the first substrate 110, and a second etch is then required to remove the BOX layer using the monocrystalline semiconductor layer 130 as an etch stop layer.

The first substrate 110 has a main surface 111, the main surface 111 has the monocrystalline semiconductor 130 layer on top. The monocrystalline semiconductor layer 130 can be monocrystalline silicon with a typical thickness between 0.2 µm and 1.0 µm. The monocrystalline semiconductor layer 130 can be any monocrystalline semiconductor layer suitable for guiding an optical signal or supporting an optical mode. This monocrystalline semiconductor layer includes, but is not limited to, silicon, other semiconductor materials, compound semiconductors, silicon compounds, and germanium.

It is advantageous to example embodiments of the present disclosure that the planarity of the main surface 111 of the first substrate 110 is very well controlled, to achieve a first substrate 110 that has a main planar surface. The planarity of a surface is defined as the maximum deviation, between any two points of that surface, from an ideal two-dimensional plane in a direction perpendicular to that plane, and it is a measure for the absolute flatness of a surface.

It is advantageous to example embodiments of the present disclosure that the planarity of upper main surface 131 of the monocrystalline semiconductor layer 130 is well controlled, due to the conformal first dielectric layer 140. A skilled person in the art can achieve a planarity on wafer scale below 3 nm on a full 300 mm SOI wafer used as a first substrate, such as a blanket silicon SOI wafer.

It is advantageous to example embodiments of the present disclosure that the first substrate 110 and the monocrystalline semiconductor layer 130 have a controlled surface roughness, which is the local variation in planarity and can never be larger than the planarity. The surface roughness is typically 30× better controlled than the planarity and is typically below 0.1 nm, for example on any selected 0.1 mm² area, corresponding to the local scale or device scale of a 300 mm SOI wafer used as a first substrate.

The monocrystalline semiconductor layer 130 is provided with a planar and essentially flat surface and has a low surface roughness at local scale, which is the scale of the optical device according to the embodiments of the disclosure, for example <0.1 nm for a 300 mm silicon SOI wafer used as a first substrate 110.

After the first substrate 110 is provided according to step 10 of the method 90, a homogeneous and conformal first dielectric layer 140 according to step 20 of the method 90 is formed.

A homogeneous layer is defined as a single layer that has essentially equal composition and equal properties at different locations of the layer. It is a uniform layer that has essentially the same structure, composition, and properties in any location throughout the layer. A homogeneous layer does not have any structural interfaces within the layer. Structural interfaces can be, for example, explicitly designed interfaces suitable for joining two parts of the same substance into a single part. The homogeneous layer is advantageously fabricated in a single process step.

A conformal layer is defined as a layer having a constant thickness. The upper surface of a conformal layer has the same topography as the lower surface where it is formed on.

According to an example embodiment, forming the first dielectric layer 140 may include thermally growing an oxide from the monocrystalline semiconductor layer. The first dielectric layer 140 can be a semiconductor oxide, for example, formed by thermally oxidizing the monocrystalline semiconductor layer 130. In this case, part of the monocrystalline semiconductor layer 130 will be consumed by the formation of the first dielectric layer 140. The remaining part of the monocrystalline semiconductor layer 130 is the monocrystalline semiconductor layer 130 in the following steps. The formed oxide is the first dielectric layer 140. The thickness and conformity of the thermally grown oxide is known in the art to be very well and precisely controlled. For example, a thickness variation may be below 0.75 nm for a 50 nm thick oxide on a full 300 mm SOI wafer and below 0.075 nm on any 0.1 mm² area of the 300 mm SOI wafer. Other techniques yielding a homogeneous and conformal first dielectric layer 140 may be employed as well.

Figure 2B:
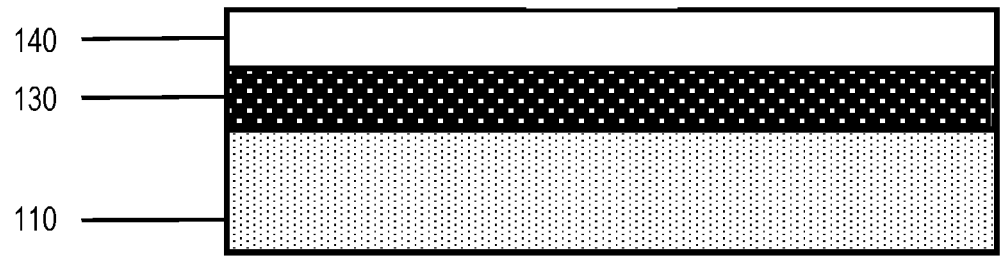

FIG. 2B illustrates a schematic representation of a cross-sectional view of the first dielectric layer 140 being a conformal layer and having a planar upper main surface and a planar lower main surface with uniform thickness that is advantageously formed in a single process step on the planar main surface of the monocrystalline semiconductor layer 130.

After the formation of the first dielectric layer 140, step 30 of the method 90 is performed, providing a dielectric waveguide core 150. The dielectric waveguide core 150 is provided on top of and in direct contact with the upper main surface of the first dielectric layer 140.

The dielectric waveguide core 150 is a waveguide core comprising a dielectric material, for example Si3N4, the stoichiometric form of silicon nitride. Other dielectric materials can be used as well, such as doped or undoped semiconductor oxides, silicon nitrides, silicon oxynitrides, silicon carbides, silicon germanium, hafnium oxide, aluminum oxide, silica, and others. The thickness of the dielectric waveguide core 150 can be between 20 nm and 1 micron, while a typical value is 400 nm.

The dielectric waveguide core 150 may be suitable for supporting an optical mode and may carry an optical signal. This optical signal may be evanescently coupled to a first region 156 of the monocrystalline semiconductor layer 130 through the first dielectric layer 140. The first region 156 of the monocrystalline semiconductor layer 130 is a region in close proximity to the dielectric waveguide core 150 and enables optical coupling of the optical evanescent wave between the dielectric waveguide core 150 and the first region 156 of the monocrystalline semiconductor layer 130. The close proximity is achieved by the first dielectric layer 140 in between the dielectric waveguide core 150 and the monocrystalline semiconductor layer 130 being sufficiently thin. The first region 156 of the monocrystalline semiconductor layer is that region of the monocrystalline semiconductor layer 130 that provides sufficient optical coupling between the dielectric waveguide core 150 and the monocrystalline semiconductor layer 130 through the first dielectric layer 140. It will be obvious that the first region 156 advantageously comprises at least the intersecting, or perpendicularly projected area, of the dielectric waveguide core 150 in a plane of the upper main surface 131 of the monocrystalline semiconductor layer 130 to achieve good optical coupling. The first region 156 comprises at least the part directly underneath the dielectric waveguide core 150.

The evanescent coupling exponential decays with increasing thickness of the first dielectric layer 140. Controlling the conformity and providing a homogeneous first dielectric layer 140, according to embodiments of the current disclosure, in the region where the integrated semiconductor photonics device is to be formed will result in improved control of the optical coupling. The region where the integrated semiconductor photonics device is to be formed is the first region 156 and the second region 136, is on a local scale, and may be smaller than 0.1 mm². The planarity of the monocrystalline layer 130 is very well controlled as stated before. Better control of the optical coupling results in a larger design window for the optical designers and/or in an increased yield during manufacturing of optical devices according to the embodiments of the present disclosure because of the improved variability of the coupling coefficient.

Figure 2C:
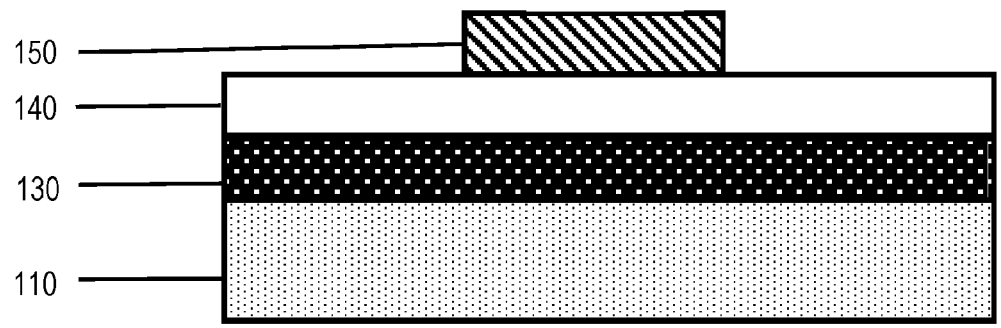

FIG. 2C illustrates a schematic representation of a cross-sectional view of the dielectric waveguide core 150 on top of and in direct contact with first dielectric layer 140. It should be noted that the dielectric waveguide core 150 is not a layer but has a shape designed to carry an optical mode, such as an optical wave propagating in a direction perpendicular to the cross section of FIG. 2C.

According to an example embodiment, forming the dielectric waveguide core 150 may include depositing a dielectric waveguide layer on top of and in direct contact with the first dielectric layer 140 and further patterning the dielectric waveguide layer to form the dielectric waveguide core 150. The techniques for deposition, patterning, and forming are well known in the art of integrated photonics and will not be detailed.

After providing the dielectric waveguide core 150, step 40 of the method 90 is performed, i.e., depositing a second dielectric layer 160 on the dielectric waveguide core 150. The second dielectric layer 160 covers the dielectric waveguide core 150.

The second dielectric layer 160 can be a semiconductor oxide, such as deposited silicon oxide (SiO2). Other materials or techniques used to deposit the second dielectric layer 160 may be, but are not limited to: spin-on glass, PE-CVD dielectrics, glasses, and silicon oxynitrides.

Figure 2D:
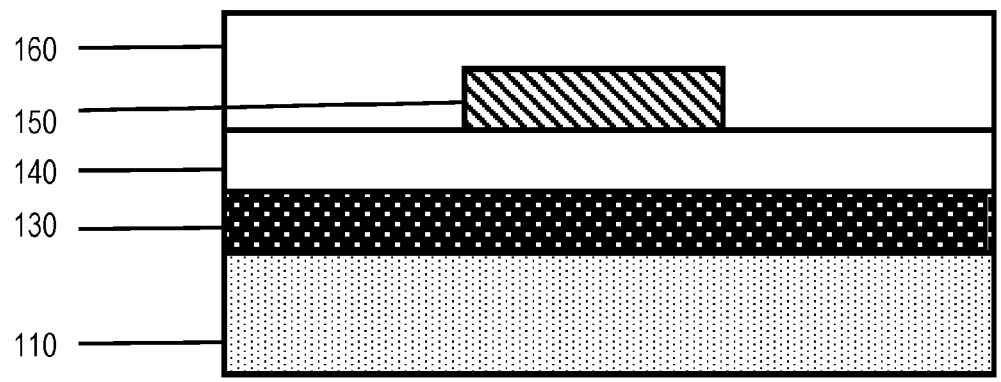

FIG. 2D illustrates a schematic representation of a cross-sectional view of the obtained structure after the second dielectric layer 160 is deposited. It should be noted that the first dielectric layer 140 and second dielectric layer 160 are part of the waveguide cladding of the dielectric waveguide core 150, and, together, the dielectric waveguide core 150 and the waveguide cladding form a dielectric waveguide suitable for supporting an optical mode.

The method 90 further includes step 50, annealing the dielectric waveguide core, thereby driving hydrogen out of the dielectric waveguide core 150. The dielectric waveguide core 150 may have a high hydrogen concentration due to its manufacturing. This is a known problem and causes optical propagation loss for an optical mode propagating through the dielectric waveguide. The anneal step 50 may be performed at temperatures above 950 degrees Celsius and for at least 1 hour, thereby driving hydrogen out of and densifying the dielectric waveguide core 150. It should be noted that a residue of hydrogen may remain present in the dielectric waveguide core 150. If the residue is small, it will have a limited effect on the propagation loss in the dielectric waveguide.

Figure 1B:
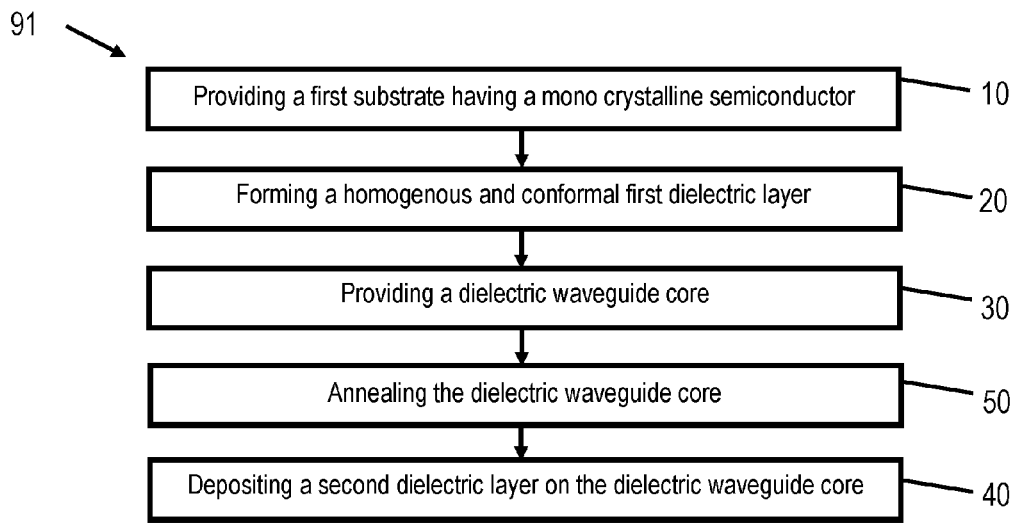

The anneal step 50 may be performed before depositing a second dielectric according to method 91 as illustrated in FIG. 1B. The anneal step 50 results in driving hydrogen out of the dielectric waveguide core 150 and giving the dielectric waveguide core 150 a low optical propagation loss. The low optical propagation loss is an optical propagation loss of the waveguide including the waveguide core and waveguide cladding, and may be below 1 dB/centimeter, or even below 0.1 dB/centimeter.

Figure 1C:
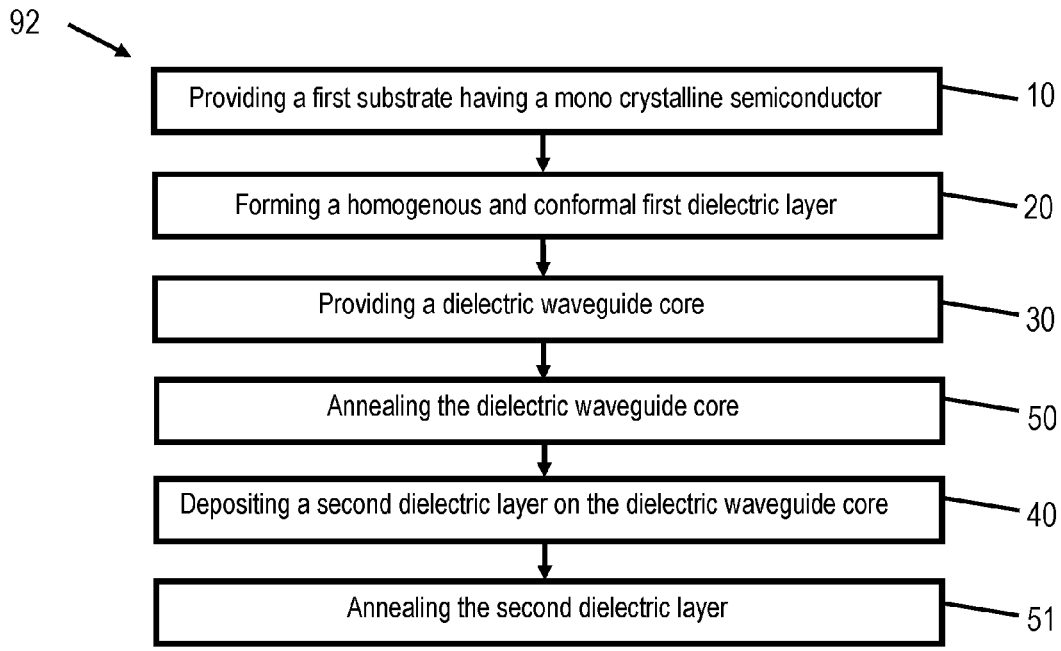

According to the method 92, illustrated in FIG. 1C, the method further includes an anneal step 51, annealing the second dielectric layer 160, thereby driving hydrogen out of the second dielectric layer 160. The anneal step 51 may be performed at temperatures above 950 degrees Celsius and for at least 1 hour.

Figure 1D:
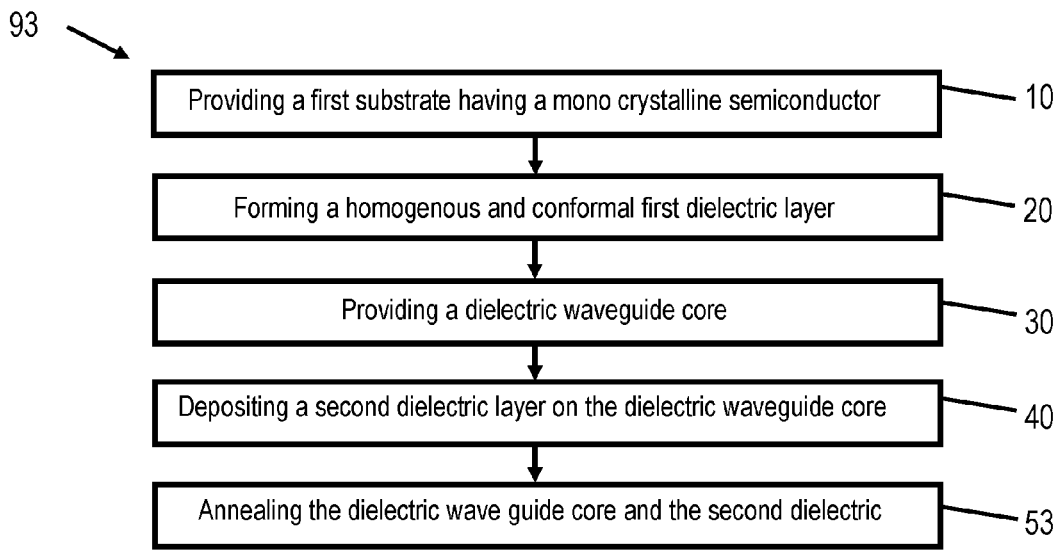

According to the method 93, illustrated in FIG. 1D, the annealing of the dielectric waveguide core is combined with the annealing of the second dielectric in an anneal step 53, thereby driving hydrogen out of the second dielectric layer 160. The anneal step 53 may be performed at temperatures above 950 degrees Celsius and for at least 1 hour.

In order to respect the thermal budget of electronic and photonic devices, the anneal steps 50, 51, and 53 may be performed prior to any doping step used to form, for instance, active devices or any metallization step used to form interconnect structures. It is an advantage of embodiments of the present disclosure that no active devices and metallization are present at the moment the anneal step 50, 51, 53 is performed, as the active devices and metallization may be introduced afterwards. The active devices can be optical and/or logical.

In example embodiments of the disclosure, it is understood that the second dielectric layer 160 may be advantageously deposited in a single step. It will be clear that if more deposition steps are performed to obtain the second dielectric layer 160, each deposition step can be followed by an anneal step. The anneal step performed on the second dielectric layer 160, which acts as a waveguide cladding for the dielectric waveguide core 150, further improves the optical propagation loss of an optical mode propagating in the dielectric waveguide.

The deposition step 40 may introduce impurities in the second dielectric layer 160. These impurities, like hydrogen, may be driven out with the anneal steps 51, 53 as defined earlier, thereby driving hydrogen out of the dielectric waveguide.

It should be noted that methods 91, 92, and 93 are all variations of method 90, with all three variants being envisaged within embodiments according to the present disclosure.

According to an example embodiment, the first and second dielectric layers may have a refractive index lower than the refractive index of the waveguide core. This is a condition for forming a waveguide with the dielectric waveguide core 150 as the core of the waveguide propagating the optical mode, where the first and second dielectric layers act as a waveguide cladding surrounding the dielectric waveguide core 150. The waveguide cladding causes the optical mode to be confined to the waveguide core. Confinement can be total or partial as is known in the art.

According to an example embodiment, the method may further include providing a second substrate 210 having a third dielectric layer 220 on a main surface of the second substrate 210. This second substrate 210 serves as mechanical support in some of the further embodiments of the present disclosure. The second substrate 210 may be a semiconductor substrate, such as a silicon substrate, suitable for use with planar semiconductor integration technologies. Other materials suitable for the second substrate 210 may include, but are not limited to, glass, fused silica, germanium, silicon germanium, or other compound semiconductor materials. The third dielectric layer 220 material is a dielectric material and may, for example, be a semiconductor oxide, such as an oxide formed by thermal oxidation or a deposited semiconductor oxide, for example deposited silicon oxide (SiO2). Other materials or techniques used to deposit the third dielectric layer 220 may be, but are not limited to: spin-on glass, PE-CVD dielectrics, glasses, and silicon oxynitrides.

Figure 3A:
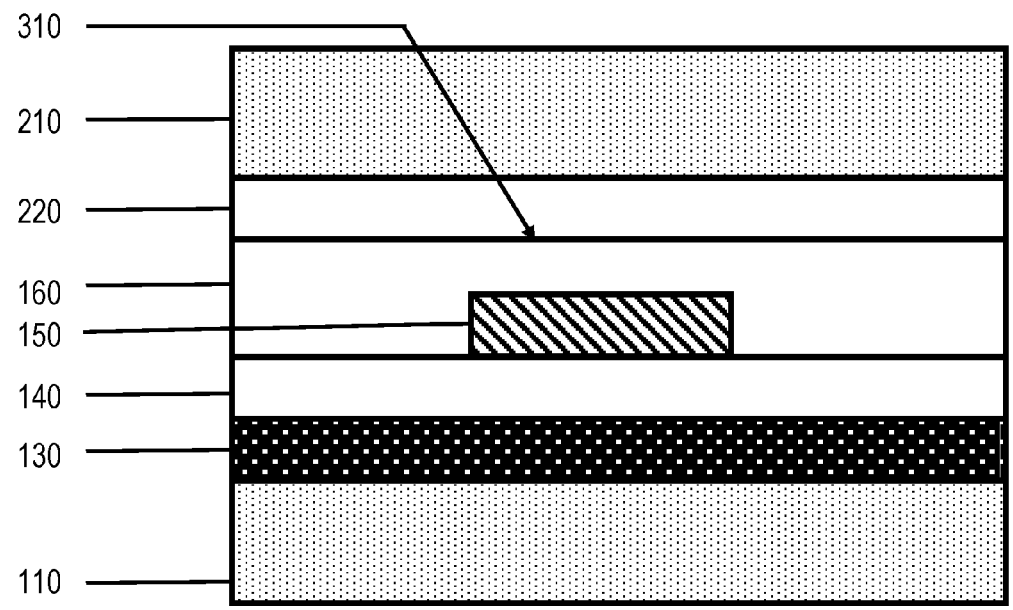
FIGS. 3A-3C illustrate a set of cross-sectional views of a portion of the integrated semiconductor photonics device at different steps of the method according to further embodiments of the present disclosure.

According to an example embodiment, the method may further include attaching the second substrate 210 to the first substrate 110 by attaching the third dielectric layer 220 to the second dielectric layer 160 at an attaching interface 310, as illustrated in FIG. 3A. It will be clear to a person skilled in the art that the main surfaces of the third and second dielectric layers need sufficiently low planarity and limited surface roughness to achieve an attachment. Any impurities introduced in creating these planar surfaces on the second and third dielectric layers at the attaching interface 310 can be removed by annealing, as known in the art. An additional annealing on the second substrate 210 after the planarization of the third dielectric layer 220 may be required prior to attaching. Different techniques for attaching the third dielectric layer 220 to the second dielectric layer 160 may include, but are not limited to, applying an adhesive layer or direct oxide-oxide bonding.

According to an example embodiment, the first, second, and third dielectric layers may have a refractive index lower than the refractive index of the waveguide core 150. This is a condition for forming a waveguide with the dielectric waveguide core 150 as the core of the waveguide propagating the optical mode, where the first, second, and third dielectric layer act as a waveguide cladding surrounding the dielectric waveguide core 150.

Figure 3B:
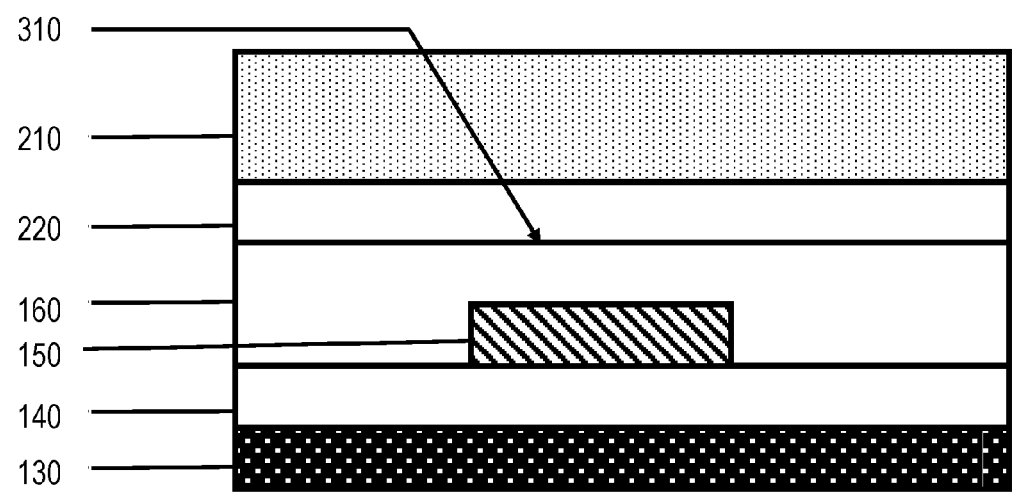

According to an example embodiment, the method may further include exposing the monocrystalline semiconductor layer 130 by removing the first substrate 110. FIG. 3B shows a cross-sectional view, of a portion of the obtained integrated semiconductor photonics device after this step in the method. This exposing can be achieved by similar means for removing the first substrate 110 from the monocrystalline semiconductor layer 130, as previously disclosed. Removal of the first substrate 110 may be accomplished by etching, for example by multiple etching steps using multiple etch recipes to remove the first substrate 110 and eventual oxide layers it may contain selectively. To expose the monocrystalline semiconductor layer 130, the etching may be assisted by an etch stop layer enabling selective etching at different etch rates.

When using SOI substrates or SOI wafers as the first substrate 110 having a monocrystalline semiconductor layer 130 suitable for supporting an optical mode, the first dielectric layer 140 can be formed by thermal oxidation, as previously disclosed in the present disclosure. The SOI substrate or SOI wafer can further contain a BOX layer in between the first substrate 110 and the monocrystalline semiconductor layer 130 that can act as an etch stop layer for the first substrate 110 in the removing of the first substrate 110. Removing the BOX layer itself for exposing the monocrystalline semiconductor layer 130 may require, for example, a dedicated etching step that uses the monocrystalline semiconductor layer 130 as a stopping layer.

Figure 3C:
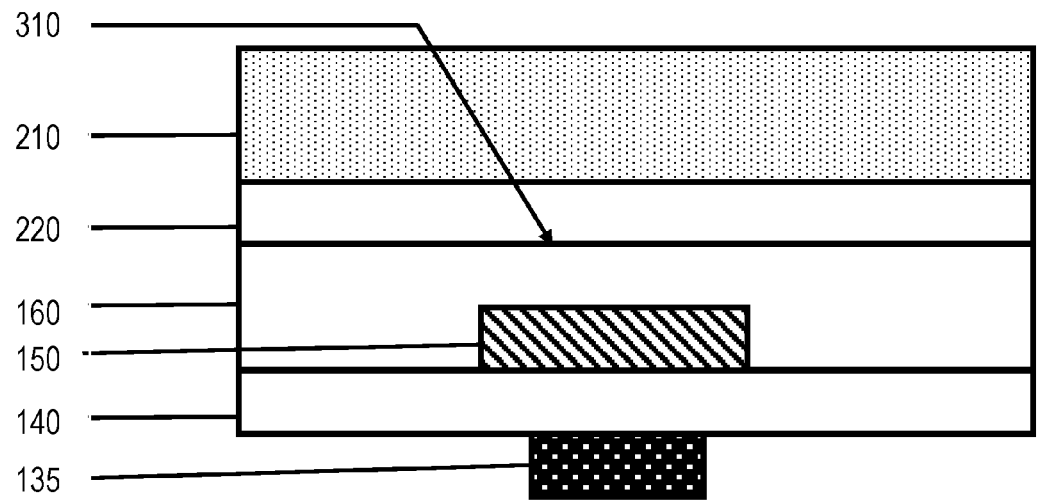

According to an example embodiment, the method may further include, after annealing, forming an optical component in the exposed monocrystalline semiconductor layer 130. FIG. 3C shows a cross-sectional view of a portion of the obtained integrated semiconductor photonics device after this step in the method. The exposed monocrystalline semiconductor layer 130 may be patterned and etched to define and form optical components that may include, but are not limited to: gratings, semiconductor waveguides, power splitters, power combiners, and optical modulators.

Figure 8:
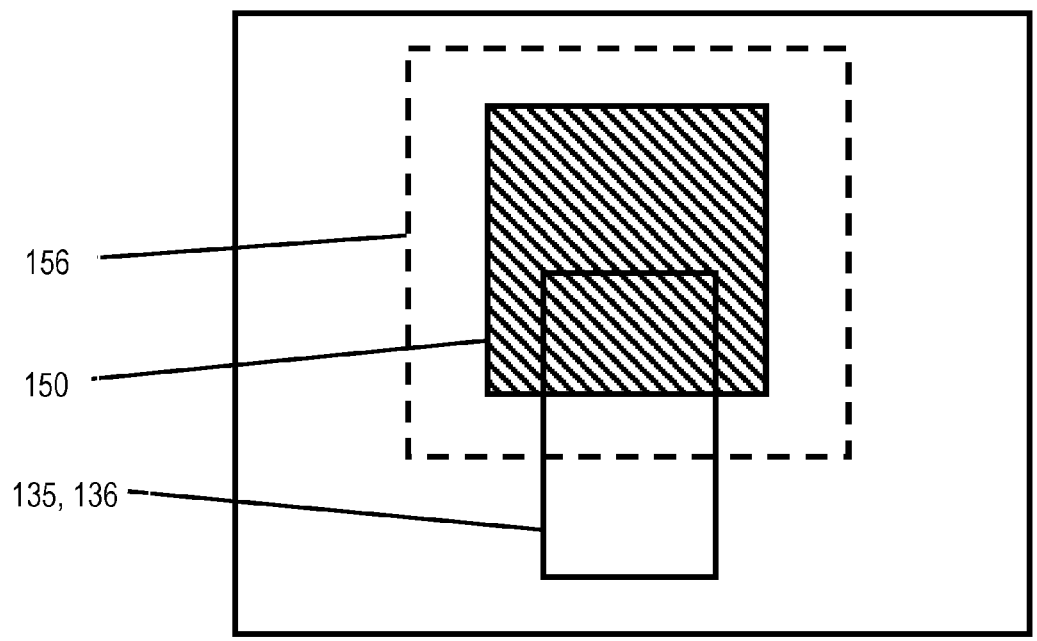
FIG. 8 illustrates a planar view of the integrated semiconductor photonics device according to an embodiment of the disclosure.

According to an example embodiment, forming an optical component may include forming a semiconductor waveguide core 135 in a second region 136 of the monocrystalline semiconductor layer 130, the second region 136 comprising at least part of the first region 156 of the monocrystalline semiconductor layer 130. This embodiment enables a method for fabricating an optical evanescently coupled and annealed dielectric waveguide core 150 coupled to a semiconductor waveguide core 135. The optical component is formed in the second region 136 of the monocrystalline semiconductor layer 130 which comprises at least part of the first region 156 and is optically coupled to the dielectric waveguide core 150 by evanescent coupling through the first dielectric layer 140. An optical coupling is realized in the region where the first and second region overlap, e.g., the coupling is realized between the dielectric waveguide core 150 and the semiconductor waveguide core 135. FIG. 8 illustrates a planar view of an example integrated semiconductor photonics device including the first region 156, the second region 136, the semiconductor waveguide core 135, and the dielectric waveguide core 150. It should be noted that FIG. 8 is an example and other variations are possible.

According to an example embodiment, forming the optical component may include doping part of the exposed monocrystalline semiconductor layer. This embodiment enables the use of active optical devices, such as PN junctions, PIN junctions, detectors, modulators, attenuators, and others. Doping is a known process in the integrated photonics art and will not be explained in detail.

According to an example embodiment, the method may further include a singulation step after the formation of the optical component for obtaining a number of substantially identical integrated semiconductor devices. The singulation may be executed when the second substrate is, for example, a wafer comprising a number of substantially identical integrated semiconductor devices. The singulation step may be a dicing step using a saw, laser, or another suitable technique. From a single substrate, a number of substantially identical integrated semiconductor devices may be obtained by this embodiment of the method. Substantially identical devices are a number of the same optical device, based on a single design pattern, fabricated according to the method of the present disclosure. The single design pattern may be repeated on different locations of the substrate main surface to obtain a number of substantially identical optical devices on the substrate. The singulation step is used to single out a set of these substantially identical optical devices.

In a further aspect, the present disclosure relates to an integrated semiconductor photonics device including a planar monocrystalline semiconductor layer, a homogeneous and conformal first dielectric layer formed on the monocrystalline semiconductor layer, a dielectric waveguide core formed on the first dielectric layer adapted to optically couple to a first region of the monocrystalline semiconductor layer through the first dielectric layer, and a second dielectric layer adapted to cover the dielectric waveguide core. The hydrogen content of at least the dielectric waveguide core may be selected to form a waveguide with a propagation loss less than 1 dB per centimeter.

Figure 4:
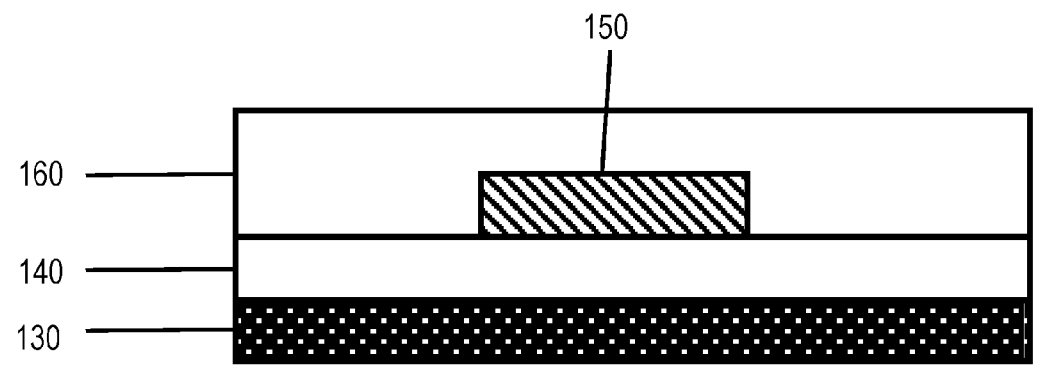
FIG. 4 illustrates a cross-sectional view of a portion of the integrated semiconductor photonics device according to an embodiment of the disclosure.

FIG. 4 shows a cross-sectional view of a portion of an example integrated semiconductor photonics device.

The planar monocrystalline semiconductor layer 130 may have a typical thickness between 0.2 μm and 1.0 μm. The monocrystalline semiconductor layer 130 can be, for example, monocrystalline silicon or any monocrystalline semiconductor layer suitable for guiding an optical signal or supporting an optical mode. This may include, but is not limited to, compound semiconductors, silicon compounds, and germanium. The monocrystalline semiconductor layer 130 may have a main planar surface with a planarity typically below 3 nm for a 300 mm wafer as a substrate, and preferably below 0.1 nm on device scale, where the device scale is of the order of 10 μm to 333 μm. The main planar surface may be essentially a flat surface, having a low surface roughness below 0.1 nm in any 0.1 mm$^2$ area of the planar surface.

A homogeneous layer is defined as a single layer being advantageously fabricated in a single process step and having essentially equal composition and equal properties in different locations of the layer. It is a uniform layer having essentially the same structure, composition, and properties in any location of the layer. The homogeneous layer does not have any structural interfaces within the layer. Structural interfaces can be, for example, explicitly designed interfaces suitable for joining two parts of the same substance into a single part.

A conformal layer is defined as a layer having a constant thickness. The upper surface of the conformal layer has the same topography as the lower surface on which it is formed. The first dielectric layer 140 may be a semiconductor oxide, such as silicon oxide or germanium oxide.

The dielectric waveguide core 150 may be a waveguide core comprising dielectric material, such as Si3N4, the stoichiometric form of silicon nitride. Other dielectric materials can be used as well, such as doped or undoped semiconductor oxides, silicon nitrides, silicon oxynitrides, silicon carbides, silicon germanium, hafnium oxide, aluminum oxide, silica, and others. The thickness of the dielectric waveguide core 150 may be between 20 nm and 1 μm, while a typical value is 400 nm.

The dielectric waveguide core 150 may be suitable for supporting an optical mode and can carry an optical signal. The dielectric waveguide core 150 may be adapted to optically couple to a first region 156 of the monocrystalline semiconductor layer through the first dielectric layer 140 by evanescently coupling the optical signal between the dielectric waveguide core 150 and the first region 156 of the monocrystalline semiconductor layer 130. It should be noted that the optical coupling may be bi-directional.

The first region 156 of the monocrystalline semiconductor layer 130 may be a region in close proximity to the dielectric waveguide core 150 allowing optical coupling of the optical evanescent wave between the dielectric waveguide core 150 and the first region 156 of the monocrystalline semiconductor layer 130. The close proximity may be achieved by the first dielectric layer 140 in between the dielectric waveguide core 150 and the monocrystalline semiconductor layer 130 being sufficiently thin. The close proximity may be further achieved by selecting a first region 156 of the monocrystalline semiconductor layer 130 so as to provide sufficient optical coupling as required by the application. The first region 156 of the monocrystalline semiconductor layer may be that region of the monocrystalline semiconductor layer 130 that provides sufficient optical coupling between the dielectric waveguide core 150 and the monocrystalline semiconductor layer 130 through the first dielectric layer 140. The first region 156 advantageously comprises at least the intersecting, or perpendicularly projected area, of the dielectric waveguide core 150 in a plane of the upper main surface 131 of the monocrystalline semiconductor layer 130 to achieve good optical coupling. The first region 156 may comprise at least the area directly underneath the dielectric waveguide core 150.

The evanescent coupling exponentially decays with increasing thickness of the first dielectric layer 140. Controlling the conformity of the first dielectric layer 140 and providing a homogeneous first dielectric layer 140, according to embodiments of the current disclosure, in the region where the integrated semiconductor photonics device is to be formed will result in improved control of the optical coupling. The region where the integrated semiconductor photonics device is to be formed may be the first region 156, and the second region 136 may be on a local scale, and may be smaller than 0.1 mm$^2$.

The planarity of the monocrystalline layer 130 can be very well controlled as stated before. Better control of the optical coupling results in a larger design window for the optical designers and or in an increased yield during manufacturing of optical devices according to the embodiments of the present disclosure because of the improved variability of the coupling coefficient.

The dielectric waveguide core may be an annealed dielectric waveguide core, which is adapted so that hydrogen is driven out of it. The annealed dielectric waveguide core may have a low optical propagation loss. The low optical propagation loss may be an optical propagation loss for an optical mode propagating in the waveguide below 1 dB/cm, or even below 0.1 dB/cm.

Alternatively, the dielectric waveguide core and the second dielectric may be an annealed dielectric waveguide core and an annealed second dielectric, and may be adapted so that hydrogen is driven out of them. The annealed dielectric waveguide has low optical propagation loss. The low optical propagation loss may be an optical propagation loss below 1 dB/centimeter, or even below 0.1 dB/centimeter. The annealed second dielectric layer 160 may offer a further improvement in the propagation loss in the dielectric. It should be noted that the propagation loss is for a waveguide containing a waveguide core and a waveguide cladding. The waveguide cladding is the first and second dielectric.

Figure 5:
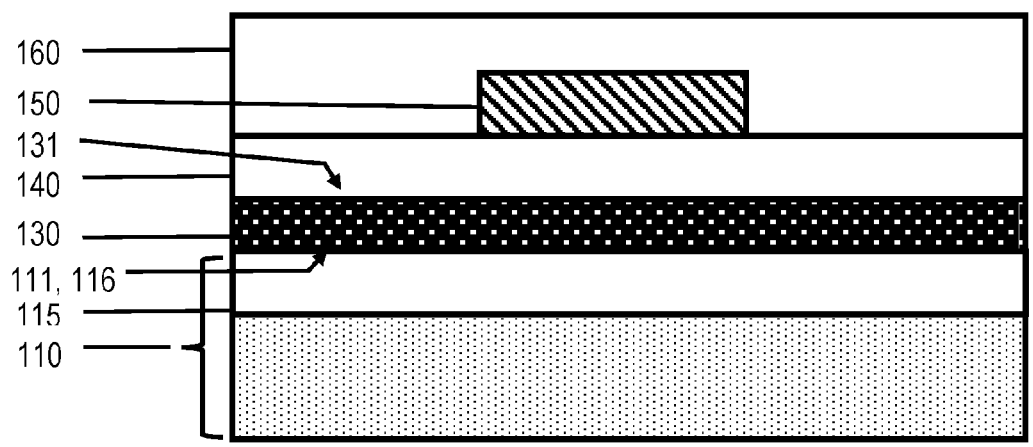
FIG. 5 illustrates a cross-sectional view of a portion of the integrated semiconductor photonics device according to a further embodiment of the disclosure.

According to an example embodiment, the integrated photonics device may further include a first substrate 110 on which the monocrystalline semiconductor layer 130 is located. FIG. 5 shows a cross-sectional view, of a portion of an example integrated semiconductor photonics device. The first substrate 110 may have a main surface 111 in direct contact, at a contacting interface 116, with a surface opposite the upper main planar surface 131 of the monocrystalline semiconductor layer 130. The opposite surface has a planar surface, provided the monocrystalline semiconductor layer 130 is a conformal layer.

The first substrate 110 may be, for example, a SOI, such that the contacting interface 116 is the boundary between the monocrystalline semiconductor layer 130 and the BOX layer 115 of the SOI, which is the first substrate 110. The first substrate 110 can comprise a semiconductor substrate, such as a silicon substrate suitable for use with planar semiconductor integration technologies. Other materials suitable for the substrate may include, but are not limited to: glass, fused silica, germanium, silicon germanium, or other compound semiconductor materials. The first substrate 110 may be a sacrificial substrate and suitable for providing mechanical support during handling of the integrated photonics device.

Figure 6:
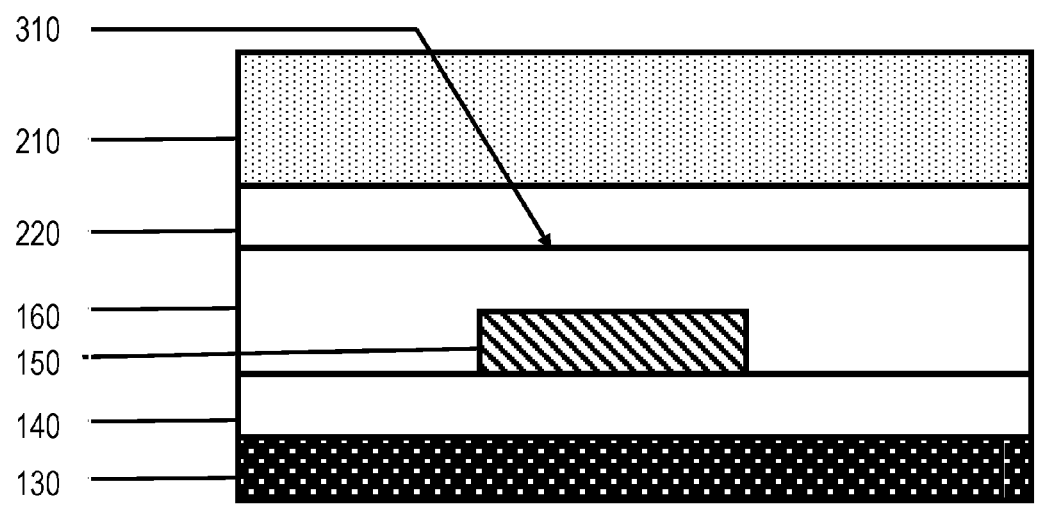
FIG. 6 illustrates a cross-sectional view of a portion of the integrated semiconductor photonics device according to a further embodiment of the disclosure.

According to an example embodiment, the integrated photonics device may further include a second substrate 210 with a third dielectric layer 220 formed thereon, where the third dielectric layer is attached to the second dielectric layer at an attaching interface. FIG. 6 shows a cross-sectional view of a portion of a related integrated semiconductor photonics device.

The second substrate 210 may serve as mechanical support in further embodiments of the present disclosure, such as when the first substrate 110 is a sacrificial substrate and is removed to expose the monocrystalline semiconductor layer 130. The second substrate 210 can be a semiconductor substrate, such as a silicon substrate suitable for use with planar semiconductor integration technologies. Other materials suitable for the second substrate 210 may include, but are not limited to: glass, fused silica, germanium, silicon germanium, or other compound semiconductor materials.

The third dielectric layer 220 is formed using a dielectric material and may be a semiconductor oxide, for example, formed by thermal oxidation, or may be a deposited semiconductor oxide, such as deposited silicon oxide ($SiO_2$). Other materials or techniques used to deposit the third dielectric layer 220 may include, but are not limited to: spin-on glass, PE-CVD dielectrics, glasses, and silicon oxynitrides.

The second substrate is attached to the first substrate by attaching the third dielectric layer 220 to the second dielectric layer 160 at an attaching interface 310. It will be clear to a person skilled in the art that the main surfaces of the third and second dielectric layers need sufficient planarity and limited surface roughness to achieve an adequate attachment. Different techniques used for attaching the third dielectric layer 220 to the second dielectric layer 160 may include, but are not limited to, an adhesive layer or direct oxide-oxide bonding.

According to an example embodiment, the integrated photonics device may further include a third dielectric layer 220 adapted, through an annealing process for example, so that hydrogen is driven out of it. The annealed third dielectric layer offers a further improvement in the propagation loss.

According to an example embodiment, the integrated photonics device may further include a monocrystalline semiconductor optical waveguide core 135 in a second region 136 of the monocrystalline semiconductor layer 130, where the second region 136 comprises at least part of the first region 156 of the monocrystalline semiconductor layer 130.

Figure 7:
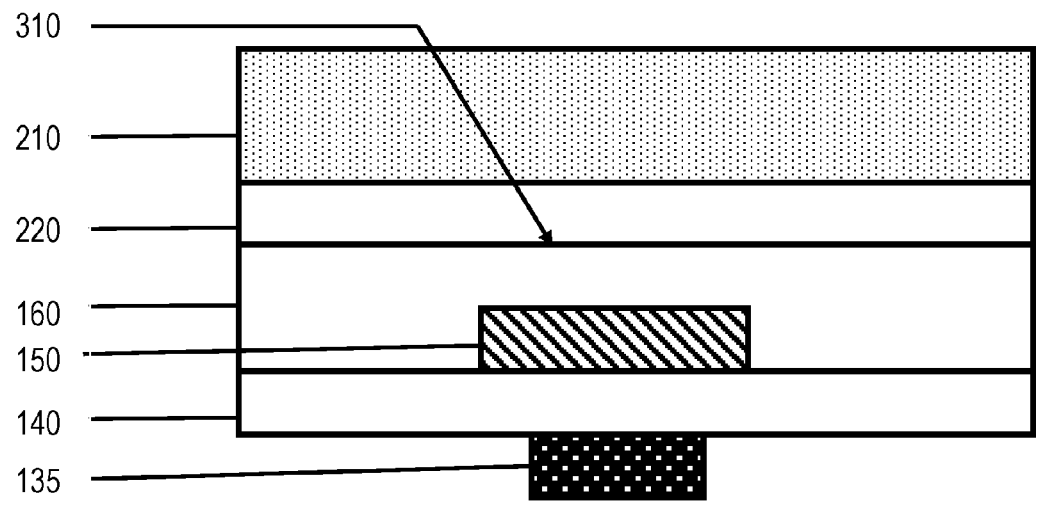
FIG. 7 illustrates a cross-sectional view of a portion of the integrated semiconductor photonics device according to a further embodiment of the disclosure.

FIG. 7 shows a cross-sectional view of a portion of an example integrated semiconductor photonics device. This embodiment relates to an integrated photonics device with an annealed dielectric waveguide core 150 evanescently coupled to a semiconductor waveguide core 135. The semiconductor optical waveguide core 135 is formed in the second region 136 of the monocrystalline semiconductor layer 130, which overlaps at least part of the first region 156. The first region 156 is optically coupled to the dielectric waveguide core 150 by evanescent coupling through the first dielectric layer 140. Thus, an optical coupling is realized in the region where the first and second regions overlap, and the coupling is between the dielectric waveguide core 150 and the semiconductor waveguide core 135.

Further optical devices may be present in the monocrystalline semiconductor layer 130. These may include, but are not limited to: waveguides, gratings, couplers, detectors, and modulators.

In a further aspect, the present disclosure relates to an integrated semiconductor wafer comprising a plurality of substantially identical integrated semiconductor photonics devices fabricated according to embodiments of the disclosure.

What is claimed is:

1. A method for fabricating an integrated semiconductor photonics device, the method comprising:
   providing a first substrate having on its top surface a monocrystalline semiconductor layer suitable for supporting an optical mode;
   forming a homogeneous and conformal first dielectric layer on a planar upper surface of the monocrystalline semiconductor layer;
   providing a dielectric waveguide core on the first dielectric layer, wherein the dielectric waveguide core is optically coupled to a first region of the monocrystalline semiconductor layer through the first dielectric layer;
   after providing the dielectric waveguide core on the first dielectric layer, depositing a second dielectric layer on the dielectric waveguide core, thereby covering the dielectric waveguide core, and;
   annealing the dielectric waveguide core to drive hydrogen out of the dielectric waveguide core.

2. The method of claim 1, further comprising annealing the second dielectric layer to drive hydrogen out of the second dielectric layer.

3. The method of claim 1, further comprising:
   providing a second substrate having a third dielectric layer on a surface of the second substrate;
   attaching the third dielectric layer to the second dielectric layer at an attaching interface;
   exposing the monocrystalline semiconductor layer by removing the first substrate; and
   after annealing the dielectric waveguide core, forming an optical component in the exposed monocrystalline semiconductor layer.

4. The method of claim 3, wherein forming the optical component in the exposed monocrystalline semiconductor layer comprises forming a semiconductor waveguide core in a second region of the monocrystalline semiconductor layer, wherein the second region comprises at least part of the first region of the monocrystalline semiconductor layer.

5. The method of claim 3, wherein forming the optical component in the exposed monocrystalline semiconductor layer comprises doping at least part of the exposed monocrystalline semiconductor layer.

6. The method of claim 3, wherein the second substrate is a wafer comprising a plurality of integrated semiconductor photonics devices, the method further comprising, after forming the optical component in the exposed monocrystalline semiconductor layer, singulating the wafer into a plurality of substantially identical integrated semiconductor photonics devices.

7. The method of claim 1, wherein providing the dielectric waveguide core on the first dielectric layer comprises:
   depositing a dielectric waveguide layer on the first dielectric layer; and
   patterning the dielectric waveguide layer to form the dielectric waveguide core.

8. The method of claim 1, wherein the first and second dielectric layers have a refractive index lower than the refractive index of the dielectric waveguide core.

9. The method of claim 1, wherein forming the first dielectric layer comprises thermally growing an oxide on the monocrystalline semiconductor layer.

* * * * *